(12) United States Patent
Kim et al.

(10) Patent No.: US 10,290,127 B2
(45) Date of Patent: May 14, 2019

(54) RESPONSIVE LINE DISPLAY

(71) Applicant: salesforce.com, inc., San Francisco, CA (US)

(72) Inventors: Yuseung Kim, San Jose, CA (US); Jean Elie Bovet, Los Angeles, CA (US)

(73) Assignee: saleforce.com, inc., San Francisco, CA (US)

( * ) Notice: Subject to any disclaimer, the term of this patent is extended or adjusted under 35 U.S.C. 154(b) by 35 days.

(21) Appl. No.: 14/665,290

(22) Filed: Mar. 23, 2015

(65) Prior Publication Data

US 2016/0104305 A1    Apr. 14, 2016

Related U.S. Application Data

(60) Provisional application No. 62/062,776, filed on Oct. 10, 2014.

(51) Int. Cl.
*G06T 11/20* (2006.01)

(52) U.S. Cl.
CPC .................. *G06T 11/206* (2013.01)

(58) Field of Classification Search
CPC ..................................... G06T 11/206
See application file for complete search history.

(56) References Cited

U.S. PATENT DOCUMENTS

| | | | |
|---|---|---|---|
| 5,491,779 A * | 2/1996 | Bezjian | G06T 11/206 345/419 |
| 5,577,188 A | 11/1996 | Zhu | |
| 5,608,872 A | 3/1997 | Schwartz | |
| 5,649,104 A | 7/1997 | Carleton | |
| 5,715,450 A | 2/1998 | Ambrose et al. | |
| 5,761,419 A | 6/1998 | Schwartz | |
| 5,819,038 A | 10/1998 | Carleton | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 6,092,083 A | 7/2000 | Brodersen et al. | |
| 6,161,149 A | 12/2000 | Achacoso et al. | |

(Continued)

FOREIGN PATENT DOCUMENTS

JP         2003265417 A  *  9/2003

*Primary Examiner* — Jeffery A Brier
(74) *Attorney, Agent, or Firm* — Dergosits & Noah LLP; Todd A. Noah

(57) ABSTRACT

Some embodiments of the present invention include an apparatus for displaying line charts with responsive line thickness using a display screen of a mobile computing system and include a processor, and one or more stored sequences of instructions which, when executed by the processor, cause the processor to receive a request to display a line chart on a display screen of a mobile computing system with the line chart having multiple line segments, determine density of information to be displayed with the line chart, and display the line chart with thickness of lines of the line chart corresponding to the determined density of information. The thickness of the line segments of the line chart is relatively thinner when the line chart includes higher density of information and relatively thicker when the line chart includes lower density of information.

17 Claims, 12 Drawing Sheets

(56) References Cited

U.S. PATENT DOCUMENTS

| | | | |
|---|---|---|---|
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |
| 6,295,530 B1 | 9/2001 | Ritchie et al. | |
| 6,324,568 B1 | 11/2001 | Diec et al. | |
| 6,324,693 B1 | 11/2001 | Brodersen et al. | |
| 6,336,137 B1 | 1/2002 | Lee et al. | |
| D454,139 S | 3/2002 | Feldcamp et al. | |
| 6,367,077 B1 | 4/2002 | Brodersen et al. | |
| 6,393,605 B1 | 5/2002 | Loomans | |
| 6,405,220 B1 | 6/2002 | Brodersen et al. | |
| 6,434,550 B1 | 8/2002 | Warner et al. | |
| 6,446,089 B1 | 9/2002 | Brodersen et al. | |
| 6,535,909 B1 | 3/2003 | Rust | |
| 6,549,908 B1 | 4/2003 | Loomans | |
| 6,553,563 B2 | 4/2003 | Ambrose et al. | |
| 6,560,461 B1 | 5/2003 | Fomukong et al. | |
| 6,574,635 B2 | 6/2003 | Stauber et al. | |
| 6,577,726 B1 | 6/2003 | Huang et al. | |
| 6,601,087 B1 | 7/2003 | Zhu | |
| 6,604,117 B2 | 8/2003 | Lim et al. | |
| 6,604,128 B2 | 8/2003 | Diec | |
| 6,609,150 B2 | 8/2003 | Lee et al. | |
| 6,621,834 B1 | 9/2003 | Scherpbier | |
| 6,654,032 B1 | 11/2003 | Zhu | |
| 6,665,648 B2 | 12/2003 | Brodersen et al. | |
| 6,665,655 B1 | 12/2003 | Warner et al. | |
| 6,684,438 B2 | 2/2004 | Brodersen et al. | |
| 6,711,565 B1 | 3/2004 | Subramaniam et al. | |
| 6,724,399 B1 | 4/2004 | Katchour et al. | |
| 6,728,702 B1 | 4/2004 | Subramaniam et al. | |
| 6,728,960 B1 | 4/2004 | Loomans et al. | |
| 6,732,095 B1 | 5/2004 | Warshavsky et al. | |
| 6,732,100 B1 | 5/2004 | Brodersen et al. | |
| 6,732,111 B2 | 5/2004 | Brodersen et al. | |
| 6,754,681 B2 | 6/2004 | Brodersen et al. | |
| 6,763,351 B1 | 7/2004 | Subramaniam et al. | |
| 6,763,501 B1 | 7/2004 | Zhu | |
| 6,768,904 B2 | 7/2004 | Kim | |
| 6,772,229 B1 | 8/2004 | Achacoso et al. | |
| 6,782,383 B2 | 8/2004 | Subramaniam et al. | |
| 6,804,330 B1 | 10/2004 | Jones et al. | |
| 6,826,565 B2 | 11/2004 | Ritchie et al. | |
| 6,826,582 B1 | 11/2004 | Chatterjee et al. | |
| 6,826,745 B2 | 11/2004 | Coker | |
| 6,829,655 B1 | 12/2004 | Huang et al. | |
| 6,842,748 B1 | 1/2005 | Warner et al. | |
| 6,850,895 B2 | 2/2005 | Brodersen et al. | |
| 6,850,949 B2 | 2/2005 | Warner et al. | |
| 7,062,502 B1 | 6/2006 | Kesler | |
| 7,233,843 B2 * | 6/2007 | Budhraja | H02J 3/008 700/291 |
| 7,340,411 B2 | 3/2008 | Cook | |
| 7,356,482 B2 | 4/2008 | Frankland et al. | |
| 7,401,094 B1 | 7/2008 | Kesler | |
| 7,620,655 B2 | 11/2009 | Larsson | |
| 7,698,160 B2 | 4/2010 | Beaven et al. | |
| 7,779,475 B2 | 8/2010 | Jakobson et al. | |
| 7,851,004 B2 | 12/2010 | Hirao et al. | |
| 8,010,663 B2 | 8/2011 | Firminger et al. | |
| 8,014,943 B2 | 9/2011 | Jakobson | |
| 8,015,495 B2 | 9/2011 | Achacoso et al. | |
| 8,032,297 B2 | 10/2011 | Jakobson | |
| 8,060,259 B2 * | 11/2011 | Budhraja | H02J 3/008 700/291 |
| 8,065,156 B2 * | 11/2011 | Gazdzinski | G06Q 30/0251 187/396 |
| 8,082,301 B2 | 12/2011 | Ahlgren et al. | |
| 8,095,413 B1 | 1/2012 | Beaven et al. | |
| 8,095,594 B2 | 1/2012 | Beaven et al. | |
| 8,209,308 B2 | 6/2012 | Rueben et al. | |
| 8,275,836 B2 | 9/2012 | Beaven et al. | |
| 8,290,778 B2 * | 10/2012 | Gazdzinski | G06Q 30/0251 187/396 |
| 8,296,146 B2 * | 10/2012 | Gazdzinski | G06Q 30/0251 187/396 |
| 8,401,710 B2 * | 3/2013 | Budhraja | H02J 3/008 700/291 |
| 8,484,111 B2 | 7/2013 | Frankland et al. | |
| 8,490,025 B2 | 7/2013 | Jakobson et al. | |
| 8,504,945 B2 | 8/2013 | Jakobson et al. | |
| 8,510,664 B2 | 8/2013 | Rueben et al. | |
| 8,566,301 B2 | 10/2013 | Rueben et al. | |
| 8,646,103 B2 | 2/2014 | Jakobson et al. | |
| 8,712,777 B1 * | 4/2014 | Gazdzinski | G06Q 30/0251 187/396 |
| 8,719,037 B2 * | 5/2014 | Gazdzinski | G06Q 30/0251 187/396 |
| 8,719,038 B1 * | 5/2014 | Gazdzinski | G06Q 30/0251 369/24.01 |
| 8,781,839 B1 * | 7/2014 | Gazdzinski | G06Q 30/0251 369/30.01 |
| 2001/0044791 A1 | 11/2001 | Richter et al. | |
| 2002/0072951 A1 | 6/2002 | Lee et al. | |
| 2002/0082892 A1 | 6/2002 | Raffel | |
| 2002/0129352 A1 | 9/2002 | Brodersen et al. | |
| 2002/0140731 A1 | 10/2002 | Subramaniam et al. | |
| 2002/0143997 A1 | 10/2002 | Huang et al. | |
| 2002/0162090 A1 | 10/2002 | Parnell et al. | |
| 2002/0165742 A1 | 11/2002 | Robins | |
| 2003/0004971 A1 | 1/2003 | Gong | |
| 2003/0018705 A1 | 1/2003 | Chen et al. | |
| 2003/0018830 A1 | 1/2003 | Chen et al. | |
| 2003/0066031 A1 | 4/2003 | Laane et al. | |
| 2003/0066032 A1 | 4/2003 | Ramachandran et al. | |
| 2003/0069936 A1 | 4/2003 | Warner et al. | |
| 2003/0070000 A1 | 4/2003 | Coker et al. | |
| 2003/0070004 A1 | 4/2003 | Mukundan et al. | |
| 2003/0070005 A1 | 4/2003 | Mukundan et al. | |
| 2003/0074418 A1 | 4/2003 | Coker et al. | |
| 2003/0120675 A1 | 6/2003 | Stauber et al. | |
| 2003/0151633 A1 | 8/2003 | George et al. | |
| 2003/0159136 A1 | 8/2003 | Huang et al. | |
| 2003/0187921 A1 | 10/2003 | Diec et al. | |
| 2003/0189600 A1 | 10/2003 | Gune et al. | |
| 2003/0204427 A1 | 10/2003 | Gune et al. | |
| 2003/0206192 A1 | 11/2003 | Chen et al. | |
| 2004/0001092 A1 | 1/2004 | Rothwein et al. | |
| 2004/0015981 A1 | 1/2004 | Coker et al. | |
| 2004/0027388 A1 | 2/2004 | Berg et al. | |
| 2004/0128001 A1 | 7/2004 | Levin et al. | |
| 2004/0186860 A1 | 9/2004 | Lee et al. | |
| 2004/0193510 A1 | 9/2004 | Catahan et al. | |
| 2004/0199489 A1 | 10/2004 | Barnes-Leon et al. | |
| 2004/0199536 A1 | 10/2004 | Barnes Leon et al. | |
| 2004/0249854 A1 | 12/2004 | Barnes-Leon et al. | |
| 2004/0260534 A1 | 12/2004 | Pak et al. | |
| 2004/0260659 A1 | 12/2004 | Chan et al. | |
| 2004/0268299 A1 | 12/2004 | Lei et al. | |
| 2005/0050555 A1 | 3/2005 | Exley et al. | |
| 2005/0091098 A1 | 4/2005 | Brodersen et al. | |
| 2008/0053405 A1 * | 3/2008 | Vigild | F02D 35/027 123/406.26 |
| 2009/0063415 A1 | 3/2009 | Chatfield et al. | |
| 2009/0100342 A1 | 4/2009 | Rueben et al. | |
| 2009/0177744 A1 | 7/2009 | Marlow et al. | |
| 2011/0242106 A1 * | 10/2011 | Hao | G06T 11/206 345/440 |
| 2012/0233137 A1 | 9/2012 | Jakobson et al. | |
| 2012/0284111 A1 * | 11/2012 | Shi | G06Q 30/0241 705/14.41 |
| 2013/0218948 A1 | 8/2013 | Jakobson | |
| 2013/0218949 A1 | 8/2013 | Jakobson | |
| 2013/0218966 A1 | 8/2013 | Jakobson | |
| 2014/0359537 A1 | 12/2014 | Jakobson et al. | |

(56) References Cited

U.S. PATENT DOCUMENTS

| | | |
|---|---|---|
| 2015/0007050 A1 | 1/2015 | Jakobson et al. |
| 2015/0199420 A1* | 7/2015 | Hansen ............. G06F 17/30604 707/737 |
| 2016/0285707 A1* | 9/2016 | Pawlowski ........... H04L 43/045 |

* cited by examiner

RESPONSIVE LINE DISPLAY

CROSS-REFERENCE TO RELATED APPLICATION

This application claims the benefit of U.S. Provisional Patent Application No. 62/062,776, filed on Oct. 10, 2014, which is hereby incorporated by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure relates generally to data processing, and more specifically relates to mobile analytics and responsive line display.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

A line chart is the most popular chart type in the financial industry to see a trend over a certain period of time. The line chart may provide functionalities such as filtering of time period, changing of information density, choosing high and low data point in a certain period of time, and other such functions.

However, viewing and understanding line charts displayed on mobile computing systems can be challenging. In particular, it is difficult to understand all aspects of a line chart because the small screen size only allows the display of a certain amount of information. It may possible to shift to a different view of information to provide more information, but this commonly requires switching between numerous screens to obtain a full understanding of the displayed data.

Thus, there is a need for a more convenient and user-friendly technology for displaying graphical information in a mobile computing system.

BRIEF SUMMARY

For some embodiments, methods and apparatus for displaying information related to a line chart using a computing system with a small display screen includes receiving a request to display the line chart having connected line segments, determining density of the information to be displayed with the line chart, and displaying the line chart with thickness of the line segments corresponding to the determined density of information. Other aspects and advantages of the present invention can be seen on review of the drawings, the detailed description and the claims, which follow.

BRIEF DESCRIPTION OF THE DRAWINGS

The included drawings are for illustrative purposes and serve only to provide examples of possible structures and process steps for the disclosed techniques. These drawings in no way limit any changes in form and detail that may be made to embodiments by one skilled in the art without departing from the spirit and scope of the disclosure.

DETAILED DESCRIPTION

Figure 1:
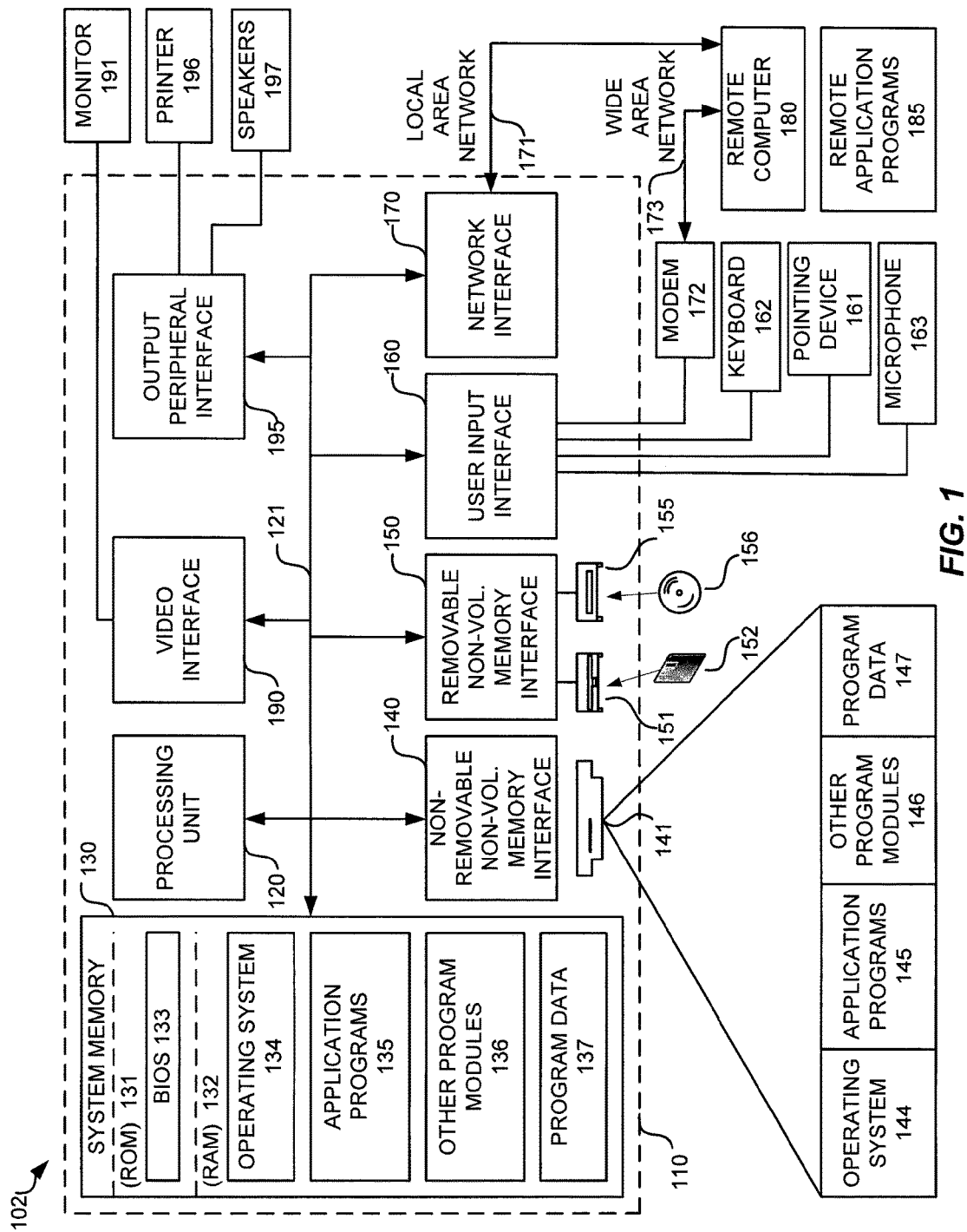
FIG. 1 shows a diagram of an example computing system that may be used with some embodiments.

Applications of systems and methods according to one or more embodiments are described in this section. These examples are being provided solely to add context and aid in the understanding of the present disclosure. It will thus be apparent to one skilled in the art that the techniques described herein may be practiced without some or all of these specific details. In other instances, well known process steps have not been described in detail in order to avoid unnecessarily obscuring the present disclosure. Other applications are possible, such that the following examples should not be taken as definitive or limiting either in scope or setting.

In the following detailed description, references are made to the accompanying drawings, which form a part of the description and in which are shown, by way of illustration, specific embodiments. Although these embodiments are described in sufficient detail to enable one skilled in the art to practice the disclosure, it is understood that these examples are not limiting, such that other embodiments may be used and changes may be made without departing from the spirit and scope of the disclosure.

As used herein, the term "multi-tenant database system" refers to those systems in which various elements of hardware and software of the database system may be shared by one or more customers. For example, a given application server may simultaneously process requests for a great number of customers, and a given database table may store rows for a potentially much greater number of customers.

The described subject matter may be implemented in the context of any computer-implemented system, such as a software-based system, a database system, a multi-tenant environment, or the like. Moreover, the described subject matter may be implemented in connection with two or more separate and distinct computer-implemented systems that cooperate and communicate with one another. One or more embodiments may be implemented in numerous ways, including as a process, an apparatus, a system, a device, a method, a computer readable medium such as a computer readable storage medium containing computer readable instructions or computer program code, or as a computer program product comprising a computer usable medium having a computer readable program code embodied therein.

As used herein, the term "mobile computing system" refers to a smartphone, smartwatch, tablet computer, notebook or laptop computer, handheld computer, mobile Internet computing system, wearable technology, or other mobile electronic computing system that includes processing and display capability. The term "chart" refers any visual or graphical representation of data values, including, for example, pie charts, bar charts, line graphs, and other similar representations of data values. The term "line chart" or "line graph" refers to a chart illustrating a value in two dimensions following the progression of a line or multiple lines. A line chart commonly, but not exclusively, expresses a particular value along a vertical axis and a time period for the value along a horizontal axis.

The disclosed embodiments may include a method for displaying line charts using a display screen of a mobile computing system. The method includes receiving a request to display a line chart on a display screen of a mobile computing system with the line chart having connected line segments, determining density of information to be displayed with the line chart, and displaying the line chart with thickness of line segments based on the determined density of information. The thickness of the line segments is relatively thinner when the line chart includes higher density of information and relatively thicker when the line chart includes lower density of information.

The disclosed embodiments may include an apparatus for displaying line charts using a display screen of a mobile computing system and include a processor, and one or more stored sequences of instructions which, when executed by the processor, cause the processor to receive a request to display a line chart on a display screen of a mobile computing system with the line chart having connected line segments, determine density of information to be displayed with the line chart, determine available screen space, and display the line chart with thickness of line segments of the line chart corresponding to the determined density of information and the determined available screen space. The thickness of the line segments is relatively thinner when the line chart includes higher density of information and relatively thicker when the line chart includes lower density of information.

The disclosed embodiments may include a machine-readable medium carrying one or more sequences of instructions for displaying line charts, which instructions, when executed by one or more processors, cause the one or more processors to receive a request to display a line chart on a display screen of a mobile computing system with the line chart having connected line segments, determine density of information to be displayed with the line chart, and display the line chart with thickness of the line segments based on the determined density of information. The thickness of the line segments of the line chart is relatively thinner when the line chart includes higher density of information and relatively thicker when the line chart includes lower density of information.

The disclosed embodiments may be related to presenting or displaying line charts using a display screen with limited screen space such as a display screen of a mobile computing system. The described subject matter may be implemented in the context of any computer-implemented system, such as a software-based system, a database system, a multi-tenant environment, or the like. Moreover, the described subject matter may be implemented in connection with two or more separate and distinct computer-implemented systems that cooperate and communicate with one another. One or more implementations may be implemented in numerous ways, including as a process, an apparatus, a system, a device, a method, a computer readable medium such as a computer readable storage medium containing computer readable instructions or computer program code, or as a computer program product comprising a computer usable medium having a computer readable program code embodied therein.

Computer System

FIG. 1 is a diagram of an example computing system that may be used with some embodiments of the present invention. The computing system 102 may be used by a user to view information associated with a multi-tenant database environment. For example, the multi-tenant database environment may be associated with the services provided by Salesforce.com®). The computing system 102 may also be used to retrieve information that relate to one or more line charts from the storage area.

The computing system 102 is only one example of a suitable computing system, such as a mobile computing system, and is not intended to suggest any limitation as to the scope of use or functionality of the design. Neither should the computing system 102 be interpreted as having any dependency or requirement relating to any one or combination of components illustrated. The design is operational with numerous other general purpose or special purpose computing systems. Examples of well-known computing systems, environments, and/or configurations that may be suitable for use with the design include, but are not limited to, personal computers, server computers, hand-held or laptop devices, multiprocessor systems, microprocessor-based systems, set top boxes, programmable consumer electronics, mini-computers, mainframe computers, distributed computing environments that include any of the above systems or devices, and the like. For example, the computing system 102 may be implemented as a mobile computing system such as one that is configured to run with an operating system (e.g., iOS) developed by Apple Inc. of Cupertino, Calif. or an operating system (e.g., Android) that is developed by Google Inc. of Mountain View, Calif.

Some embodiments of the present invention may be described in the general context of computing system executable instructions, such as program modules, being executed by a computer. Generally, program modules include routines, programs, objects, components, data structures, etc. that performs particular tasks or implement particular abstract data types. Those skilled in the art can implement the description and/or figures herein as computer-executable instructions, which can be embodied on any form of computing machine readable media discussed below.

Some embodiments of the present invention may also be practiced in distributed computing environments where tasks are performed by remote processing devices that are linked through a communications network. In a distributed computing environment, program modules may be located in both local and remote computer storage media including memory storage devices.

Referring to FIG. 1, the computing system 102 may include, but are not limited to, a processing unit 120 having one or more processing cores, a system memory 130, and a system bus 121 that couples various system components including the system memory 130 to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) locale bus, and Peripheral Component Interconnect (PCI) bus also known as Mezzanine bus.

The computing system 102 typically includes a variety of computer readable media. Computer readable media can be any available media that can be accessed by computing system 102 and includes both volatile and nonvolatile media, removable and non-removable media. By way of example, and not limitation, computer readable media may store information such as computer readable instructions, data structures, program modules or other data. Computer storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing system 102. Communication media typically embodies computer readable instructions, data structures, or program modules.

The system memory 130 may include computer storage media in the form of volatile and/or nonvolatile memory such as read only memory (ROM) 131 and random access memory (RAM) 132. A basic input/output system (BIOS) 133, containing the basic routines that help to transfer information between elements within computing system 102, such as during start-up, is typically stored in ROM 131. RAM 132 typically contains data and/or program modules that are immediately accessible to and/or presently being operated on by processing unit 120. By way of example, and not limitation, FIG. 1 also illustrates operating system 134, application programs 135, other program modules 136, and program data 137.

The computing system 102 may also include other removable/non-removable volatile/nonvolatile computer storage media. By way of example only, FIG. 1 also illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as, for example, a CD ROM or other optical media. Other removable/non-removable, volatile/nonvolatile computer storage media that can be used in the exemplary operating environment include, but are not limited to, USB drives and devices, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computing system 102. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. The operating system 144, the application programs 145, the other program modules 146, and the program data 147 are given different numeric identification here to illustrate that, at a minimum, they are different copies.

A user may enter commands and information into the computing system 102 through input devices such as a keyboard 162, a microphone 163, and a pointing device 161, such as a mouse, trackball or touch pad or touch screen. Other input devices (not shown) may include a joystick, game pad, scanner, or the like. These and other input devices are often connected to the processing unit 120 through a user input interface 160 that is coupled with the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computing system 102 may operate in a networked environment using logical connections to one or more remote computers, such as a remote computer 180. The remote computer 180 may be a personal computer, a handheld device, a server, a router, a network PC, a peer device or other common network node, and typically includes many or all of the elements described above relative to the computing system 102. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computing system 102 may be connected to the LAN 171 through a network interface or adapter 170. When used in a WAN networking environment, the computing system 102 typically includes a modem 172 or other means for establishing communications over the WAN 173, such as the Internet. The modem 172, which may be internal or external, may be connected to the system bus 121 via the user-input interface 160, or other appropriate mechanism. In a networked environment, program modules depicted relative to the computing system 102, or portions thereof, may be stored in a remote memory storage device. By way of example, and not limitation, FIG. 1 illustrates remote application programs 185 as residing on remote computer 180. It will be appreciated that the network connections shown are exemplary and other means of establishing a communications link between the computers may be used.

It should be noted that some embodiments of the present invention may be carried out on a computing system such as that described with respect to FIG. 1. However, some embodiments of the present invention may be carried out on a server, a computer devoted to message handling, handheld devices, or on a distributed system in which different portions of the present design may be carried out on different parts of the distributed computing system.

Another device that may be coupled with the system bus 121 is a power supply such as a battery or a Direct Current (DC) power supply) and Alternating Current (AC) adapter circuit. The DC power supply may be a battery, a fuel cell, or similar DC power source needs to be recharged on a periodic basis. The communication module (or modem) 172 may employ a Wireless Application Protocol (WAP) to establish a wireless communication channel. The communication module 172 may implement a wireless networking standard such as Institute of Electrical and Electronics Engineers (IEEE) 802.11 standard, IEEE std. 802.11-1999, published by IEEE in 1999.

Examples of mobile computing systems may be a laptop computer, a tablet computer, a Netbook, a smart phone, a personal digital assistant, or other similar device with on board processing power and wireless communications ability that is powered by a Direct Current (DC) power source that supplies DC voltage to the mobile computing system and that is solely within the mobile computing system and needs to be recharged on a periodic basis, such as a fuel cell or a battery.

Network

Figure 2:
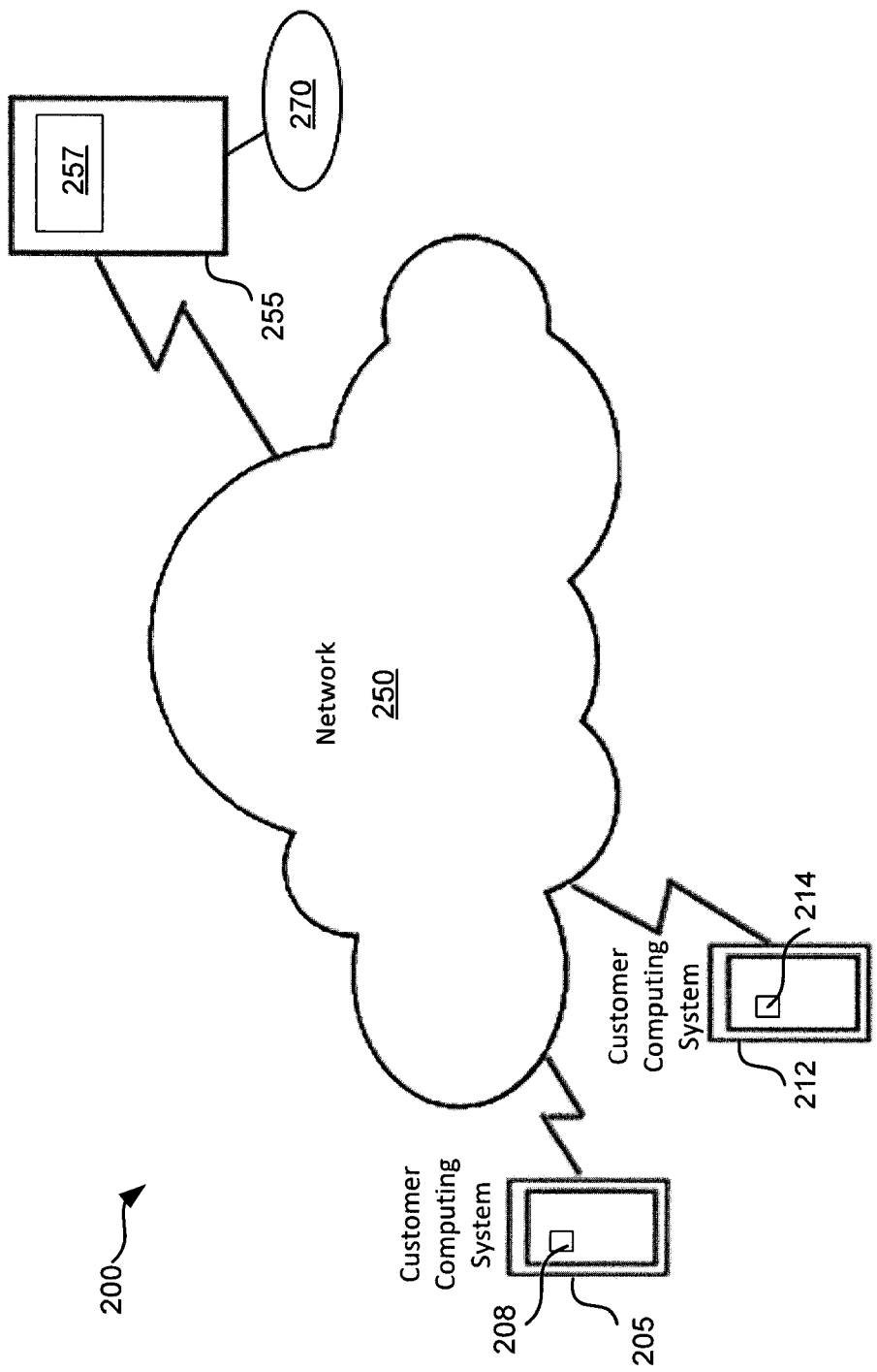
FIG. 2 shows a diagram of an example network environment that may be used with some embodiments.

FIG. 2 shows a diagram of an example network environment that may be used with some embodiments of the present invention. Network environment 200 includes computing systems 205 and 212. One or more of the computing systems 205 and 212 may be a mobile computing system. The computing systems 205 and 212 may be connected to the network 250 via a cellular connection or via a Wi-Fi router (not shown). The network 250 may be the Internet. The computing systems 205 and 212 may be coupled with server computing system 255 via the network 250.

The computing systems 205 may include application module 208. A user may use the computing system 205 and the application module 208 to connect to and communicate with the server computing system 255 and log into application 257 (e.g., a Salesforce.com® application). The server computing system 255 may be coupled with database 270. The server computing system 255 may be associated with an entity (e.g., Salesforce.com®). The user may be associated with a customer of the entity. The user may request for information from the application server 255 and may view the information on a display screen associated with the computing system 205. The information may be displayed together with one or more charts including, for example, line charts.

Figure 3:
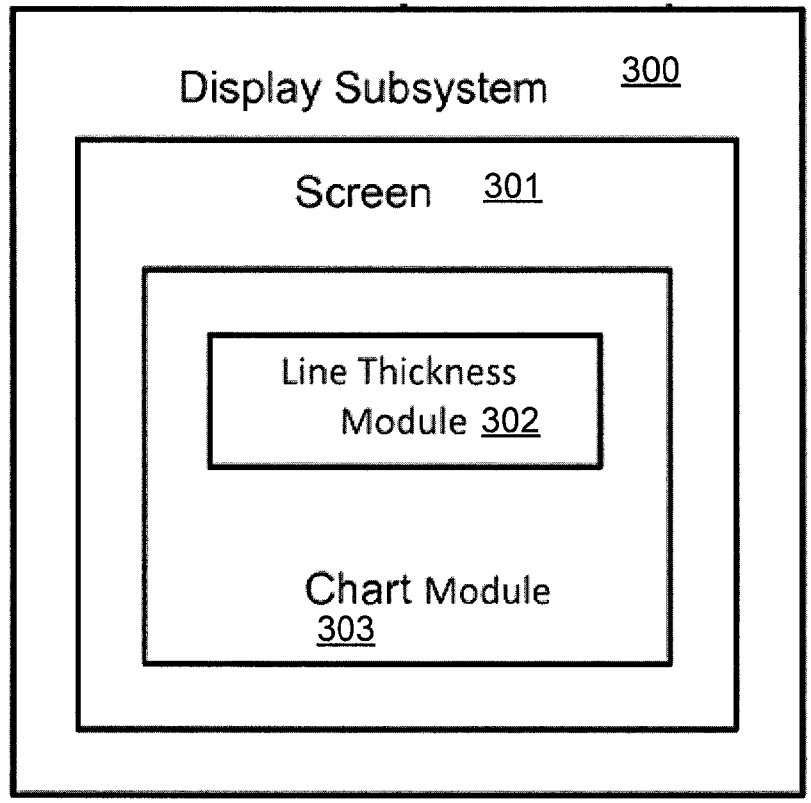
FIG. 3 shows an example display subsystem, in accordance with some embodiments.

FIG. 3 shows an example display subsystem, in accordance with some embodiments. Display subsystem 300 may be associated with a computing system that is used to display charts such as line charts. The display subsystem 300 represents hardware (such as display devices) and software (such as drivers) components that provide a display having visual, tactile, or both elements for a user to interact with the computing system. The display subsystem 300 may include a display screen 301 operable to display the line charts. The display screen 301 may include an external screen, such as an external screen to which images from the computing device are directed. This may be, for example, a mobile computing system providing images for display on a television or other external screen using a wireless or cable connection. For some embodiments, the line charts may be displayed on the external screen such as a television screen.

The computing system includes a chart module 303 configured to display the line charts and chart-related information including, for example, range information, label information, value information, etc. The line chart module 303 may include a line thickness module 302 configured to display all the line segments in a line chart using a certain thickness that may vary based on the density of the information (e.g., range information).

Figure 4:
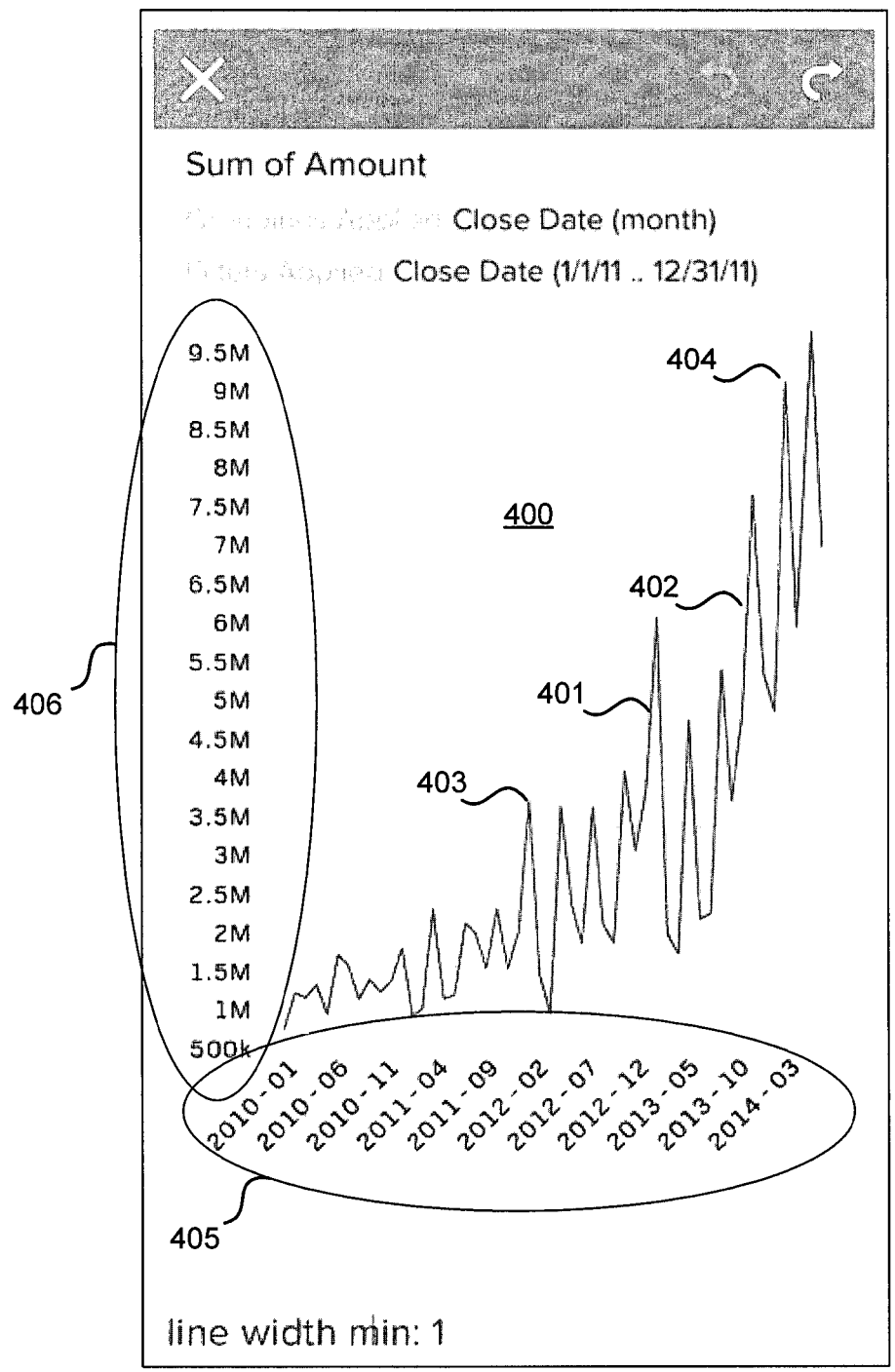
FIG. 4 shows an example line chart displayed with information at a first density level, in accordance with some embodiments.

For some embodiments, the chart module 303 is configured to have a capability of providing information regarding the relative density of information by illustrating a line chart. For some embodiments, the chart module 303 may determine an appropriate relative line thickness for lines (also referred to as line segments, as shown in FIG. 4) in a line chart. The line chart may simultaneously show the label information, the value information (shown in FIG. 4), and the density of the information by using line thickness for the line segments.

The chart module 303 may determine the density of the information in a particular view and display the line chart using a line thickness that reflect such density of information to enable a user to quickly understand the values being expressed intuitively. For example, as the mobile computing system changes a portion of a line chart being displayed from one portion to another portion, such as in response to a command from a user, the mobile computing system may automatically increases or decreases a thickness of the line segments of the line chart to reflect the density of the information on the display screen 301.

Figure 5:
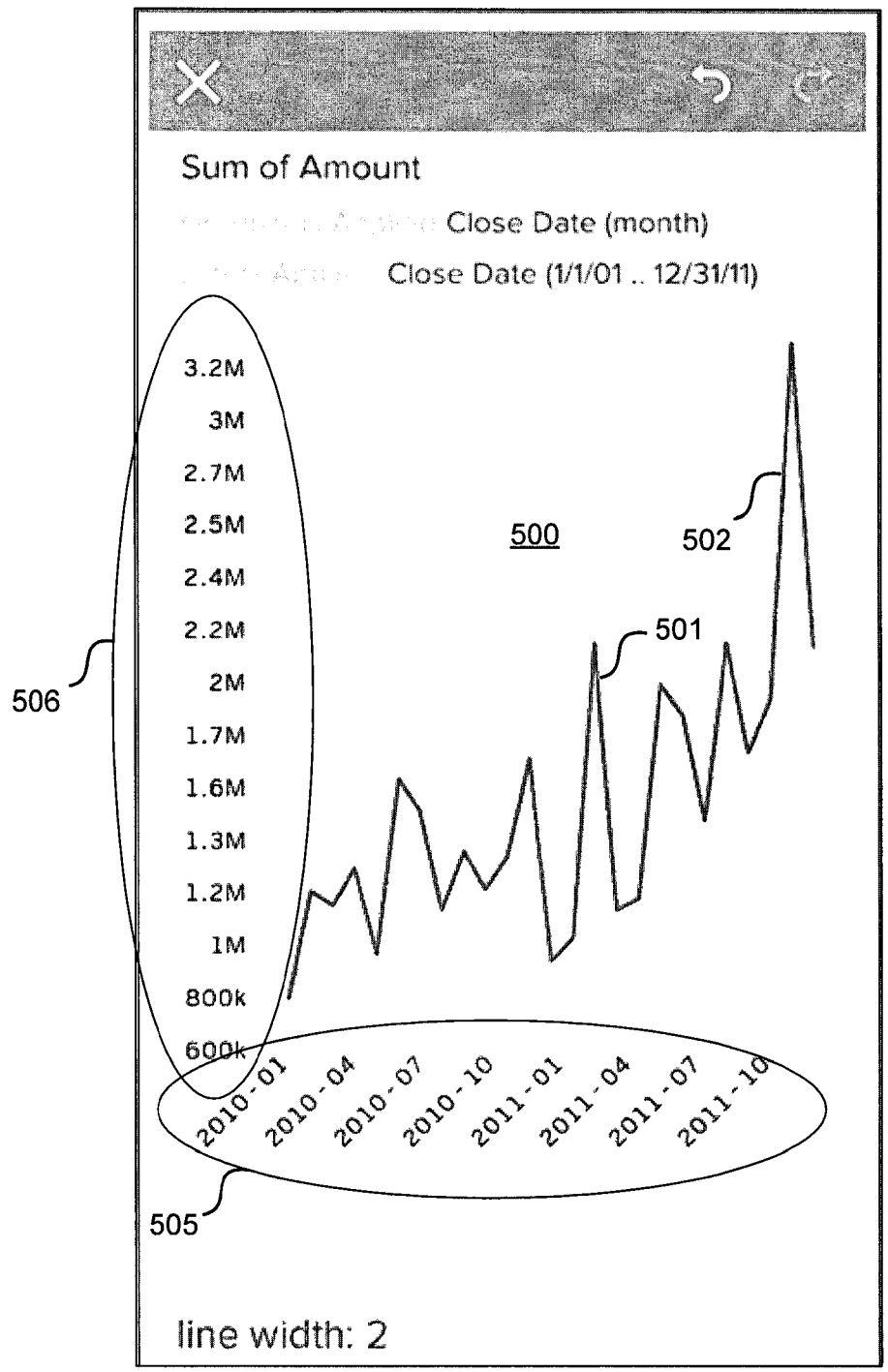
FIG. 5 shows an example line chart displayed with information at a second density level, in accordance with some embodiments.
Figure 6:
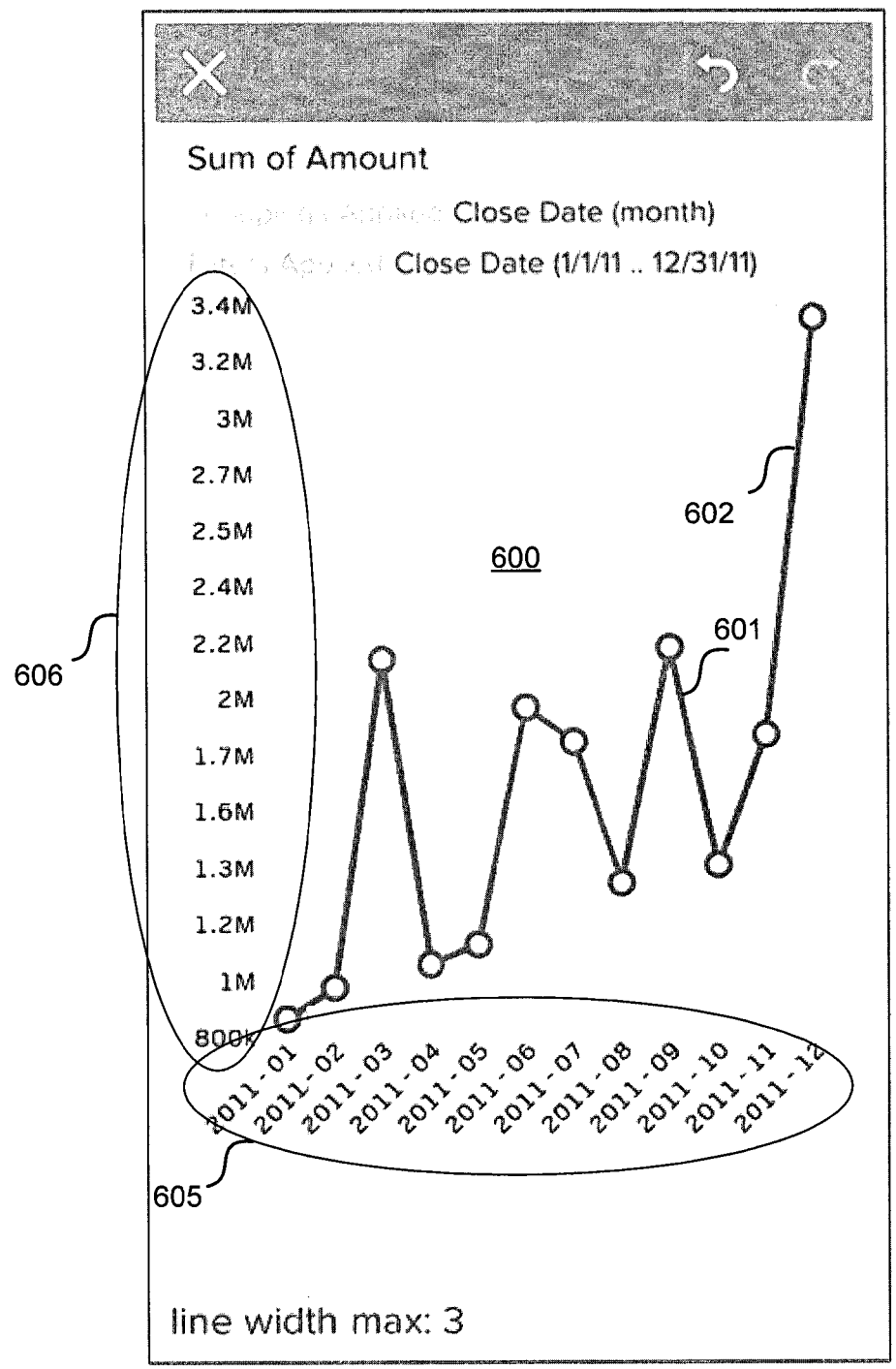
FIG. 6 shows an example line chart displayed with information at a third density level, in accordance with some embodiments.

FIGS. 4 to 6 shows examples of line charts displayed on a display screen of a mobile computing system where the line segments of the line chart are displayed using different thickness levels. The display screens described with these examples are touch sensitive screens. It may be noted that although these examples refer to the first, second and third thickness levels, these thickness levels are not meant to be restrictive and are merely used as examples to show the difference between different levels of thickness. Any two or more of levels of thickness may be used.

Referring to FIG. 4, the line chart 400 includes label information 405 and value information 406. The label information 405 in this example shows a date range from January 2010 to March 2014 for a total of 39 months. The value information 406 in this example shows the values for various points of the line chart 400 based on the label information 405. As shown in FIG. 4, the line chart 400 includes multiple connected line segments such as, for example, line segments 401 and 402. All of the line segments of the line chart 400 are displayed with the same thickness (or width or thickness level). In this example, the thickness level of the line segments in the line chart 400 is referred to as the first thickness level.

For some embodiments, the thickness of the line segments of the line chart 400 may automatically vary depending on the density of the information displayed in the line chart 400. For example, a line chart that depicts a greater density of information has thinner line segments, and a line chart that depicts a lesser density of information has thicker line segments. The thickness of the line segments may be presented as being thinner when there are more data points to be displayed on the display screen such as, for example, when there is a greater data range as shown in the line chart 400 (as analogous to zooming out or viewing from a greater distance). The thickness of the line segments may be presented as being thicker when there are less data points to be displayed on the display screen such as, for example, when a line chart includes a subset of the date range shown in the line chart 400 (as analogous to zooming in or viewing from a closer distance). In this manner, a user is able to see the context of the information by simply viewing the thickness of the line segments in the line chart 400 since the density of the information is reflected in such thickness.

For some embodiments, a graphical user interface (GUI) may be presented to enable a user to vary the thickness of the line segments. The GUI may include a filtering mechanism (e.g., date filtering mechanism) to update the information to be presented in the line chart. For example, the filtering mechanism may enable the user to specify a wider date range resulting in thinner line segments or a narrower data range resulting in thicker line segments. For some embodiments, the varying of the thickness of the line segments may enable a user to comprehend the relative view of the information when the line chart is displayed on a small display screen such as the display screens typically associated with a mobile computing system without necessarily viewing the subsidiary information on the display screen. For example, a line chart representing busy activities for a sale representative in a period of 12 months may have thinner line segments, whereas a line chart representing slow activities for another sale representative in the same 12 months period may have thicker line segments.

For some embodiments, the thickness of the line segments of the line chart 400 may be determined based upon the amount of horizontal space available on the display screen 301 and the number of points (e.g., points 403 and 404) there are in the line chart 400. For some embodiments, if there are relatively more data points and less screen space available to display, then there is greater density of information. As a result, the line segments will be relatively thinner. Conversely, if there are relatively fewer data points and more screen space available to display, then there is lesser density of information. As a result, the line segments will be relatively thicker.

Referring to FIG. 5, the line chart 500 includes label information 505 and value information 506. The label information 505 in this example shows a date range from January 2010 to October 2011 for a total of 22 months. The value information 506 in this example shows the values for various points of the line chart 500 based on the label information 505. The information included in the line chart 500 is at a lesser density (22 months) than the information included in the line chart 400 (39 months). Since both the line chart 400 and the line chart 500 are shown using the same available screen space, the line chart 500 is shown with line segments (e.g., line segments 501 and 502) that are thicker than the line segments (e.g., line segments 401 and 402) of the line chart 400. In this example, the thickness level of the line segments in the line chart 500 is referred to as the second thickness level.

Referring to FIG. 6, the line chart 600 includes label information 605 and value information 606. The label information 605 in this example shows a date range from January 2011 to December 2011 for a total of 12 months. The value information 606 in this example shows the values for various points of the line chart 600 based on the label information 605. The information included in the line chart 600 is at a lesser density (12 months) than the information included in the line chart 500 (22 months) and the information included in the line chart 400 (39 months). Since both the line chart 500 and the line chart 600 are shown using the same available screen space, the line chart 600 is shown with line segments (e.g., line segments 601 and 602) that are thicker than the line segments (e.g., line segments 501 and 502) of the line chart 500. In this example, the thickness level of the line segments in the line chart 600 is referred to as the third thickness level.

For some embodiments, whenever there is a change or update to the information to be displayed or to the available screen space, the thickness of the line segments in a particular line chart is updated. For some embodiments, a thickness threshold window may be used to determine whether the thickness of the line segments is to be updated when there is an update to the information or an update to the available screen space. For example, when the date range to be displayed in a line chart such as the line chart 400 of FIG. 4 is between 36 months and 48 months, the first thickness level (thin) may be used. Thus when the date range is updated from 38 months to 46 months, the thickness level of the line segments may remain the same. When the date range to be displayed in a line chart such as the line chart 500 of FIG. 5 is between 20 months and 36 months, the second thickness level (thicker) may be used. Thus when the date range is updated from 24 months to 30 months, the thickness level of the line segments may remain the same. When the date range to be displayed in a line chart such as the line chart 600 of FIG. 6 is between 1 month and 20 months, the third thickness level (thickest) may be used. Thus when the date range is updated from 12 months to 16 months, the thickness level of the line segments may remain the same.

Figure 7A:
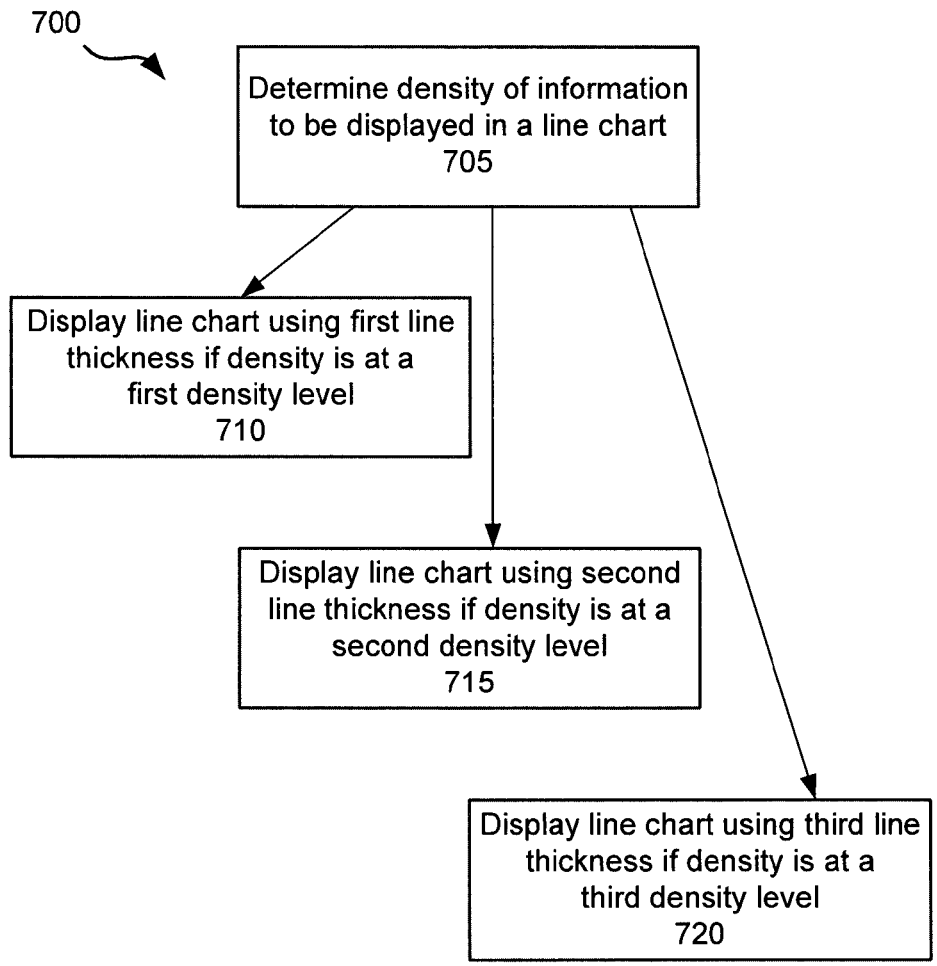
FIG. 7A shows a flowchart of an example process for displaying a line chart using line segments having thickness based on the density of information, in accordance with some embodiments.

FIG. 7A shows a flowchart of an example process for displaying a line chart using line segments having thickness based on density of information, in accordance with some embodiments. The process 700 may be performed by a chart module 303 (shown in FIG. 3) and is described based on a user or a program initiating an action to cause a line chart to be displayed on a display screen of a mobile computing system. At block 705, the chart module 303 detects that a line chart is to be displayed in the display screen based on certain label information and value information. The chart module 303 may determine the density of the information to be displayed based on the label information and/or the value information. If the density of the information is determined to be at a first density level, the line chart is displayed using the first thickness, as shown in block 710. If the density of the information is determined to be at a second density level, the line chart is displayed using the second thickness, as shown in block 715. If the density of the information is determined to be at a third density level, the line chart is displayed using the third thickness, as shown in block 720.

Figure 7B:
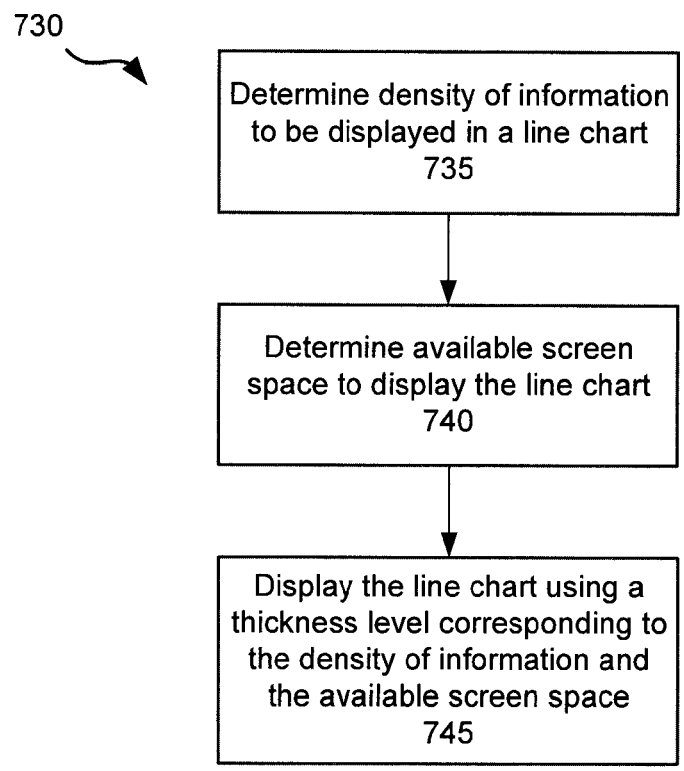
FIG. 7B shows a flowchart of an example process for displaying a line chart using line segments having thickness based on available screen space, in accordance with some embodiments.

FIG. 7B shows a flowchart of an example process for displaying a line chart using line segments having thickness based on available screen space, in accordance with some embodiments. The process 700 may be performed by a chart module 303 (shown in FIG. 3) and is described based on a user or a program initiating an action to cause a line chart to be displayed on a display screen of a mobile computing system. At block 735, the chart module 303 detects that a line chart is to be displayed in the display screen based on certain label information and value information. The chart module 303 may determine the density of the information to be displayed based on the label information and/or the value information. At block 740, the chart module 303 may determine the available screen space to display the line chart. It may be possible that the available screen space to display the line chart is not the entire display screen. Based on the density of the information and the available screen space, the chart module 303 may display the line chart using a certain line thickness, as shown in block 745.

Figure 7C:
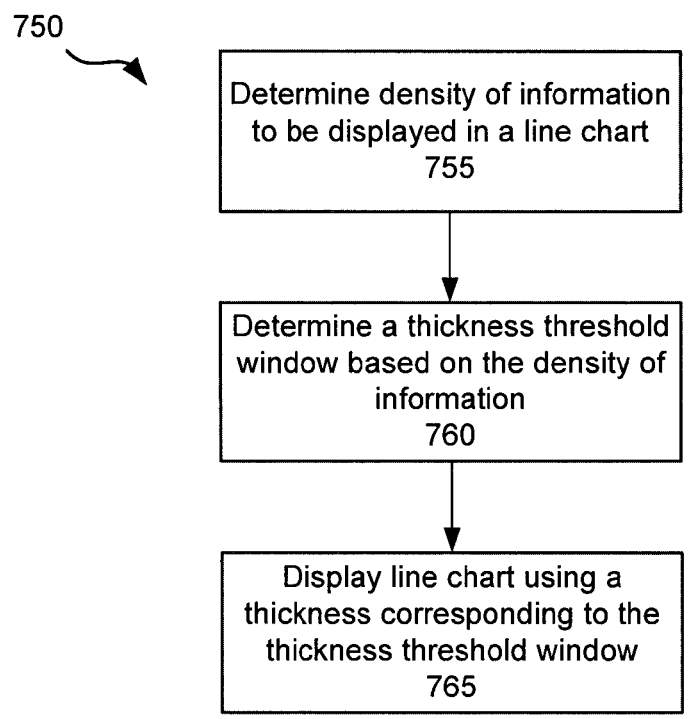
FIG. 7C shows a flowchart of an example process for displaying a line chart using line segments having thickness based on threshold windows, in accordance with some embodiments.

FIG. 7C shows a flowchart of an example process for displaying a line chart using line segments having thickness based on thickness threshold windows, in accordance with some embodiments. The process 750 may be performed by a chart module 303 (shown in FIG. 3) and is described based on a user or a program initiating an action to cause a line chart to be displayed on a display screen of a mobile computing system. At block 755, the chart module 303 detects that a line chart is to be displayed in the display screen based on certain label information and value information. The chart module 303 may determine the density of the information to be displayed based on the label information and/or the value information. At block 760, the chart module 303 may determine the thickness threshold windows based on the density of the information. There may be multiple thickness threshold windows, each associating with a different line thickness. Based on the density of the information and the thickness threshold window, the chart module 303 may display the line chart using a certain line thickness, as shown in block 765.

Figure 8A:
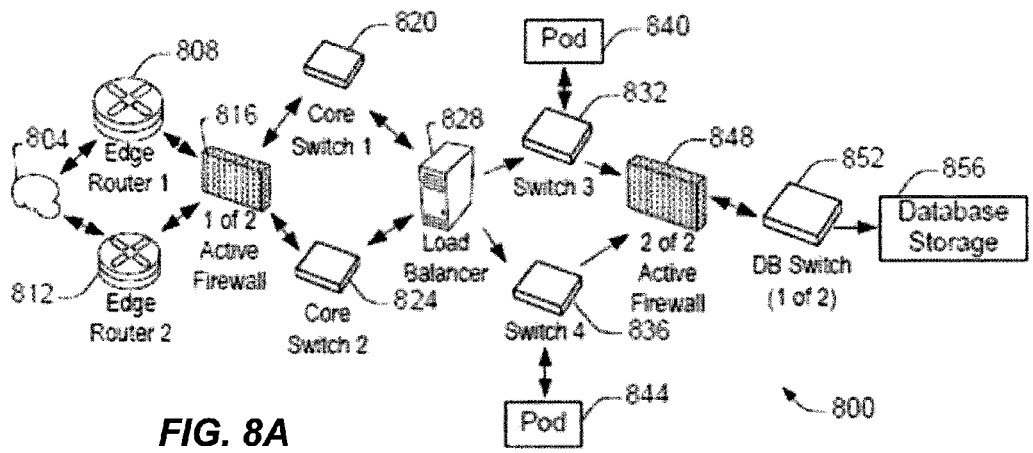
FIG. 8A shows a system diagram illustrating architectural components of an applicable environment, in accordance with some embodiments.

FIG. 8A shows a system diagram 800 illustrating architectural components of an on-demand service environment, in accordance with some embodiments. A client machine located in the cloud 804 (or Internet) may communicate with the on-demand service environment via one or more edge routers 808 and 812. The edge routers may communicate with one or more core switches 820 and 824 via firewall 816. The core switches may communicate with a load balancer 828, which may distribute server load over different pods, such as the pods 840 and 844. The pods 840 and 844, which may each include one or more servers and/or other computing resources, may perform data processing and other operations used to provide on-demand services. Communication with the pods may be conducted via pod switches 832 and 836. Components of the on-demand service environment may communicate with a database storage system 856 via a database firewall 848 and a database switch 852.

Figure 8B:
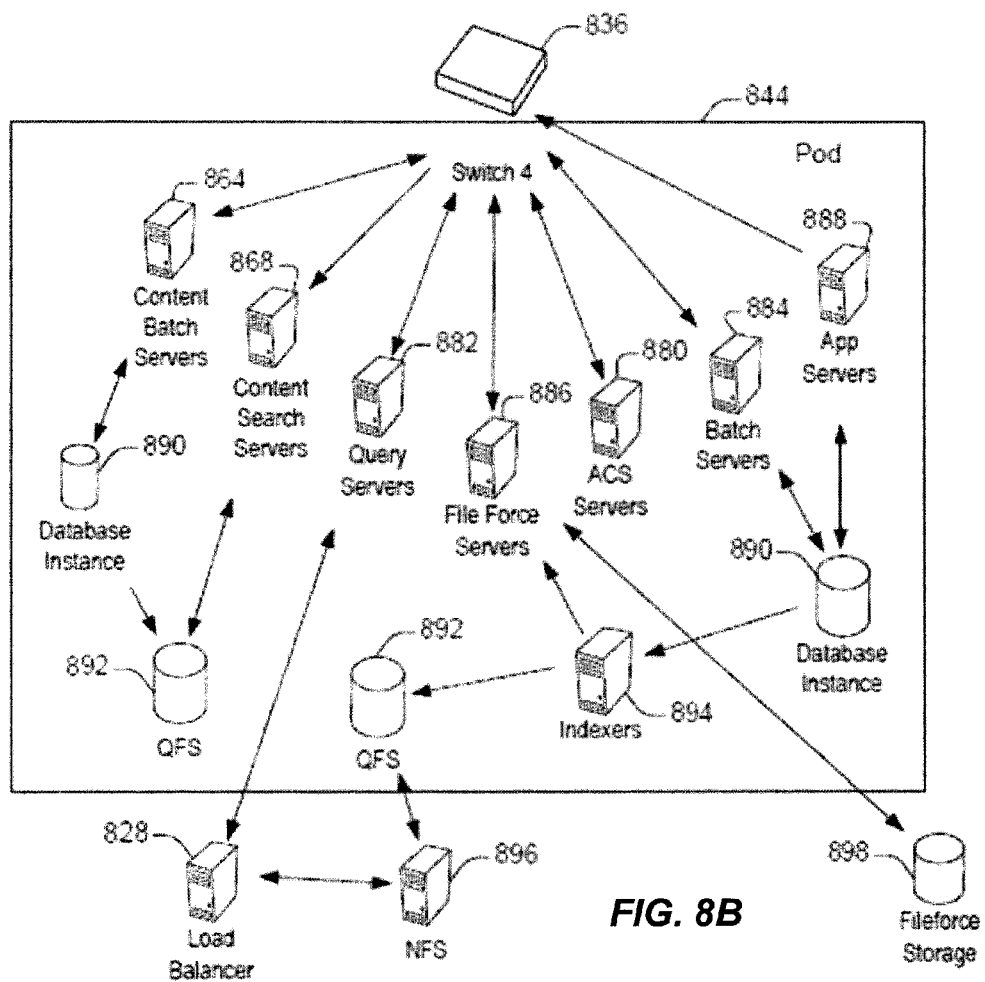
FIG. 8B shows a system diagram further illustrating architectural components of an applicable environment, in accordance with some embodiments.

As shown in FIGS. 8A and 8B, accessing an on-demand service environment may involve communications transmitted among a variety of different hardware and/or software components. Further, the on-demand service environment 800 is a simplified representation of an actual on-demand service environment. For example, while only one or two devices of each type are shown in FIGS. 8A and 8B, some embodiments of an on-demand service environment may include anywhere from one to many devices of each type. Also, the on-demand service environment need not include each device shown in FIGS. 8A and 8B, or may include additional devices not shown in FIGS. 8A and 8B.

Moreover, one or more of the devices in the on-demand service environment 800 may be implemented on the same physical device or on different hardware. Some devices may be implemented using hardware or a combination of hardware and software. Thus, terms such as "data processing apparatus," "machine," "server" and "device" as used herein are not limited to a single hardware device, but rather include any hardware and software configured to provide the described functionality.

The cloud 804 is intended to refer to a data network or plurality of data networks, often including the Internet. Client machines located in the cloud 804 may communicate with the on-demand service environment to access services provided by the on-demand service environment. For example, client machines may access the on-demand service environment to retrieve, store, edit, and/or process information.

In some embodiments, the edge routers 808 and 812 route packets between the cloud 804 and other components of the on-demand service environment 800. The edge routers 808 and 812 may employ the Border Gateway Protocol (BGP). The BGP is the core routing protocol of the Internet. The edge routers 808 and 812 may maintain a table of IP networks or 'prefixes' which designate network reachability among autonomous systems on the Internet.

In one or more embodiments, the firewall 816 may protect the inner components of the on-demand service environment 800 from Internet traffic. The firewall 816 may block, permit, or deny access to the inner components of the on-demand service environment 800 based upon a set of rules and other criteria. The firewall 816 may act as one or more of a packet filter, an application gateway, a stateful filter, a proxy server, or any other type of firewall.

In some embodiments, the core switches 820 and 824 are high-capacity switches that transfer packets within the on-demand service environment 800. The core switches 820 and 824 may be configured as network bridges that quickly route data between different components within the on-demand service environment. In some embodiments, the use of two or more core switches 820 and 824 may provide redundancy and/or reduced latency.

In some embodiments, the pods 840 and 844 may perform the core data processing and service functions provided by the on-demand service environment. Each pod may include various types of hardware and/or software computing resources. An example of the pod architecture is discussed in greater detail with reference to FIG. 8B.

In some embodiments, communication between the pods 840 and 844 may be conducted via the pod switches 832 and 836. The pod switches 832 and 836 may facilitate communication between the pods 840 and 844 and client machines located in the cloud 804, for example via core switches 820 and 824. Also, the pod switches 832 and 836 may facilitate communication between the pods 840 and 844 and the database storage 856.

In some embodiments, the load balancer 828 may distribute workload between the pods 840 and 844. Balancing the on-demand service requests between the pods may assist in improving the use of resources, increasing throughput, reducing response times, and/or reducing overhead. The load balancer 828 may include multilayer switches to analyze and forward traffic.

In some embodiments, access to the database storage 856 may be guarded by a database firewall 848. The database firewall 848 may act as a computer application firewall operating at the database application layer of a protocol stack. The database firewall 848 may protect the database storage 856 from application attacks such as structure query language (SQL) injection, database rootkits, and unauthorized information disclosure.

In some embodiments, the database firewall 848 may include a host using one or more forms of reverse proxy services to proxy traffic before passing it to a gateway router.

The database firewall 848 may inspect the contents of database traffic and block certain content or database requests. The database firewall 848 may work on the SQL application level atop the TCP/IP stack, managing applications' connection to the database or SQL management interfaces as well as intercepting and enforcing packets traveling to or from a database network or application interface.

In some embodiments, communication with the database storage system 856 may be conducted via the database switch 852. The multi-tenant database system 856 may include more than one hardware and/or software components for handling database queries. Accordingly, the database switch 852 may direct database queries transmitted by other components of the on-demand service environment (e.g., the pods 840 and 844) to the correct components within the database storage system 856. In some embodiments, the database storage system 856 is an on-demand database system shared by many different organizations. The on-demand database system may employ a multi-tenant approach, a virtualized approach, or any other type of database approach. An on-demand database system is discussed in greater detail with reference to FIGS. 9 and 10.

FIG. 8B shows a system diagram illustrating the architecture of the pod 844, in accordance with one embodiment. The pod 844 may be used to render services to a user of the on-demand service environment 800. In some embodiments, each pod may include a variety of servers and/or other systems. The pod 844 includes one or more content batch servers 864, content search servers 868, query servers 872, file force servers 876, access control system (ACS) servers 880, batch servers 884, and app servers 888. Also, the pod 844 includes database instances 890, quick file systems (QFS) 892, and indexers 894. In one or more embodiments, some or all communication between the servers in the pod 844 may be transmitted via the switch 836.

In some embodiments, the application servers 888 may include a hardware and/or software framework dedicated to the execution of procedures (e.g., programs, routines, scripts) for supporting the construction of applications provided by the on-demand service environment 800 via the pod 844. Some such procedures may include operations for providing the services described herein. The content batch servers 864 may requests internal to the pod. These requests may be long-running and/or not tied to a particular customer. For example, the content batch servers 864 may handle requests related to log mining, cleanup work, and maintenance tasks.

The content search servers 868 may provide query and indexer functions. For example, the functions provided by the content search servers 868 may allow users to search through content stored in the on-demand service environment. The Fileforce servers 876 may manage requests information stored in the Fileforce storage 878. The Fileforce storage 878 may store information such as documents, images, and basic large objects (BLOBs). By managing requests for information using the Fileforce servers 876, the image footprint on the database may be reduced.

The query servers 872 may be used to retrieve information from one or more file systems. For example, the query system 872 may receive requests for information from the app servers 888 and then transmit information queries to the NFS 896 located outside the pod. The pod 844 may share a database instance 890 configured as a multi-tenant environment in which different organizations share access to the same database. Additionally, services rendered by the pod 844 may require various hardware and/or software resources. In some embodiments, the ACS servers 880 may control access to data, hardware resources, or software resources.

In some embodiments, the batch servers 884 may process batch jobs, which are used to run tasks at specified times. Thus, the batch servers 884 may transmit instructions to other servers, such as the app servers 888, to trigger the batch jobs. In some embodiments, the QFS 892 may be an open source file system available from Sun Microsystems® of Santa Clara, Calif. The QFS may serve as a rapid-access file system for storing and accessing information available within the pod 844. The QFS 892 may support some volume management capabilities, allowing many disks to be grouped together into a file system. File system metadata can be kept on a separate set of disks, which may be useful for streaming applications where long disk seeks cannot be tolerated. Thus, the QFS system may communicate with one or more content search servers 868 and/or indexers 894 to identify, retrieve, move, and/or update data stored in the network file systems 896 and/or other storage systems.

In some embodiments, one or more query servers 872 may communicate with the NFS 896 to retrieve and/or update information stored outside of the pod 844. The NFS 896 may allow servers located in the pod 844 to access information to access files over a network in a manner similar to how local storage is accessed. In some embodiments, queries from the query servers 822 may be transmitted to the NFS 896 via the load balancer 820, which may distribute resource requests over various resources available in the on-demand service environment. The NFS 896 may also communicate with the QFS 892 to update the information stored on the NFS 896 and/or to provide information to the QFS 892 for use by servers located within the pod 844.

In some embodiments, the pod may include one or more database instances 890. The database instance 890 may transmit information to the QFS 892. When information is transmitted to the QFS, it may be available for use by servers within the pod 844 without requiring an additional database call. In some embodiments, database information may be transmitted to the indexer 894. Indexer 894 may provide an index of information available in the database 890 and/or QFS 892. The index information may be provided to file force servers 876 and/or the QFS 892.

Figure 9:
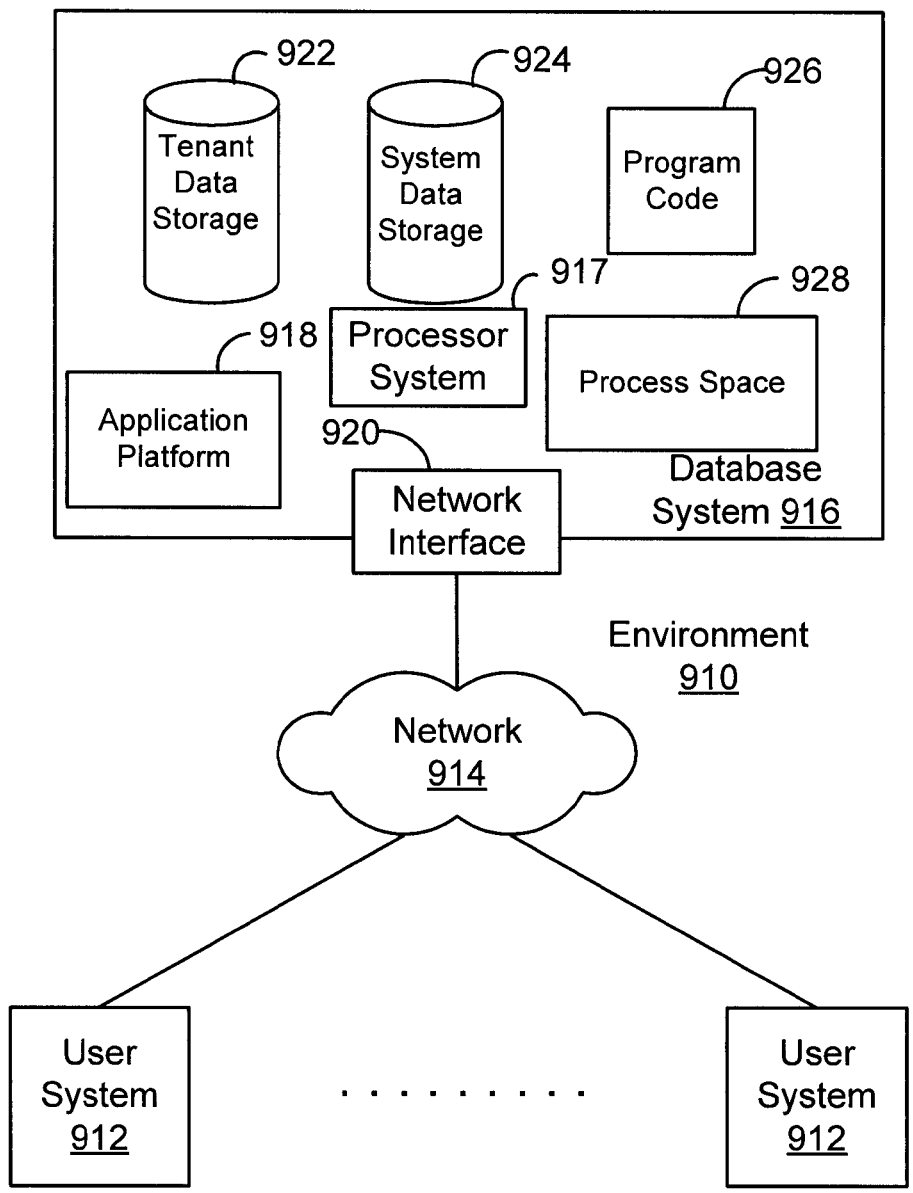
FIG. 9 shows a system diagram illustrating the architecture of a multi-tenant database environment, in accordance with some embodiments.
Figure 10:
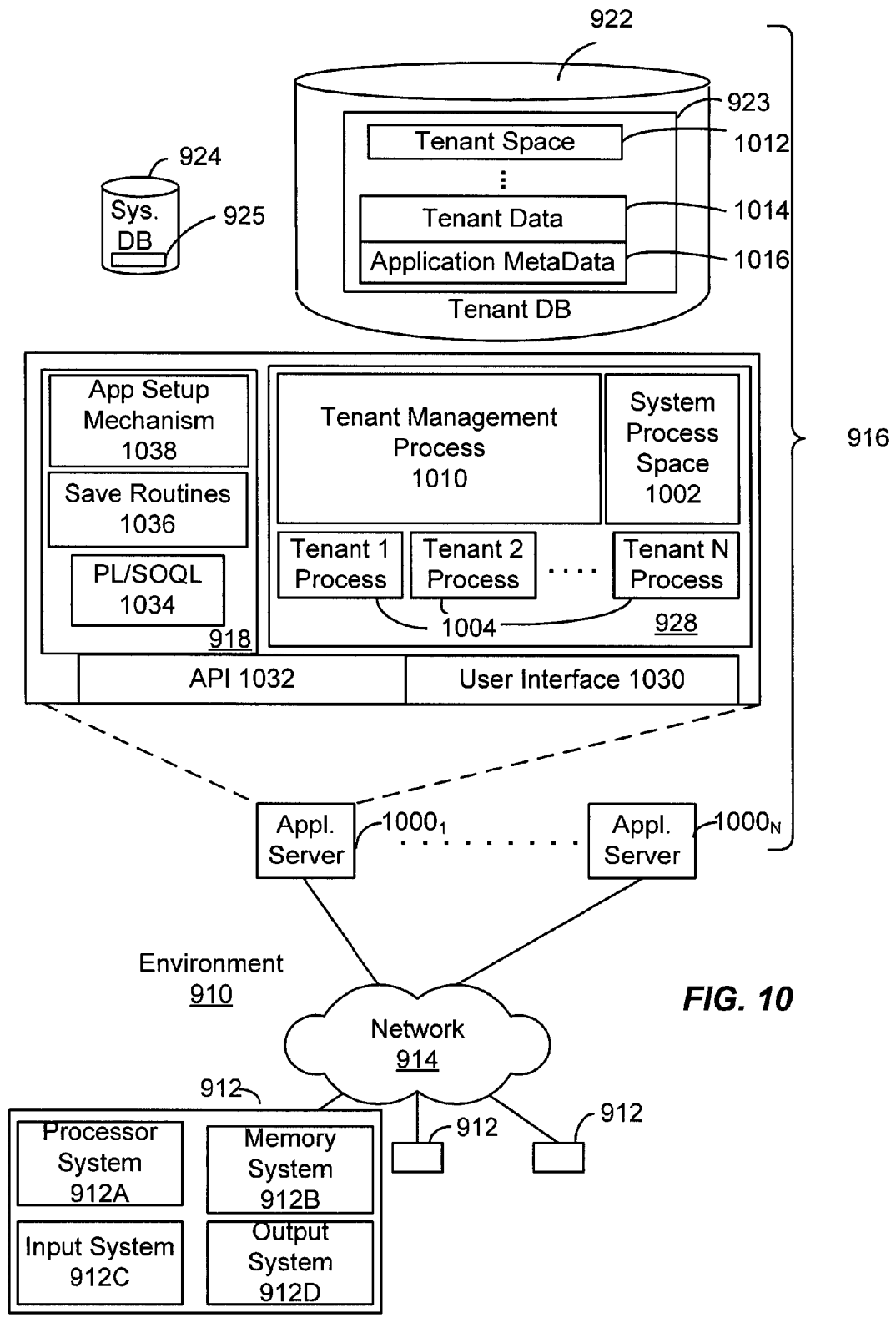
FIG. 10 shows a system diagram further illustrating the architecture of a multi-tenant database environment, in accordance with some embodiments.

FIG. 9 shows a block diagram of an environment 910 wherein an on-demand database service might be used, in accordance with some embodiments. Environment 910 includes an on-demand database service 916. User system 912 may be any machine or system that is used by a user to access a database user system. For example, any of user systems 912 can be a handheld computing system, a mobile phone, a laptop computer, a work station, and/or a network of computing systems. As illustrated in FIGS. 9 and 10, user systems 912 might interact via a network 914 with the on-demand database service 916.

An on-demand database service, such as system 916, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 916" and "system 916" will be used interchangeably herein. A database image may include one or more database objects. A relational database management system (RDBMS) or the equivalent may execute storage and retrieval of information against the database object(s). Application platform 918 may be a framework that allows the applications of system 916 to run, such as the hardware and/or software, e.g., the operating system. In an implementation, on-demand database service 916 may include an application platform 918 that enables creation, managing and executing one or more applications developed by the provider of the on-demand database service, users accessing the on-demand database service via user systems 912, or third party application developers accessing the on-demand database service via user systems 912.

One arrangement for elements of system 916 is shown in FIG. 9, including a network interface 920, application platform 918, tenant data storage 922 for tenant data 923, system data storage 924 for system data 925 accessible to system 916 and possibly multiple tenants, program code 926 for implementing various functions of system 916, and a process space 928 for executing MTS system processes and tenant-specific processes, such as running applications as part of an application hosting service. Additional processes that may execute on system 916 include database indexing processes.

The users of user systems 912 may differ in their respective capacities, and the capacity of a particular user system 912 might be entirely determined by permissions (permission levels) for the current user. For example, where a call center agent is using a particular user system 912 to interact with system 916, the user system 912 has the capacities allotted to that call center agent. However, while an administrator is using that user system to interact with system 916, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users may have different capabilities with regard to accessing and modifying application and database information, depending on a user's security or permission level.

Network 914 is any network or combination of networks of devices that communicate with one another. For example, network 914 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network (e.g., the Internet), that network will be used in many of the examples herein. However, it should be understood that the networks used in some embodiments are not so limited, although TCP/IP is a frequently implemented protocol.

User systems 912 might communicate with system 916 using TCP/IP and, at a higher network level, use other common Internet protocols to communicate, such as HTTP, FTP, AFS, WAP, etc. In an example where HTTP is used, user system 912 might include an HTTP client commonly referred to as a "browser" for sending and receiving HTTP messages to and from an HTTP server at system 916. Such an HTTP server might be implemented as the sole network interface between system 916 and network 914, but other techniques might be used as well or instead. In some embodiments, the interface between system 916 and network 914 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In some embodiments, system 916, shown in FIG. 9, implements a web-based customer relationship management (CRM) system. For example, in some embodiments, system 916 includes application servers configured to implement and execute CRM software applications as well as provide related data, code, forms, web pages and other information to and from user systems 912 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 916 implements applications other than, or in addition to, a CRM application. For example, system 916 may provide tenant access to multiple hosted (standard and custom) applications. User (or third party developer) applications, which may or may not include CRM, may be supported by the application platform 918, which manages creation, storage of the applications into one or more database objects and executing of the applications in a virtual machine in the process space of the system 916.

Each user system 912 could include a desktop personal computer, workstation, laptop, PDA, cell phone, or any wireless access protocol (WAP) enabled device or any other computing system capable of interfacing directly or indirectly to the Internet or other network connection. User system 912 typically runs an HTTP client, e.g., a browsing program, such as Microsoft's Internet Explorer® browser, Mozilla's Firefox® browser, Opera's browser, or a WAP-enabled browser in the case of a cell phone, PDA or other wireless device, or the like, allowing a user (e.g., subscriber of the multi-tenant database system) of user system 912 to access, process and view information, pages and applications available to it from system 916 over network 914.

Each user system 912 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 916 or other systems or servers. For example, the user interface device can be used to access data and applications hosted by system 916, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to some embodiments, each user system 912 and all of its components are operator configurable using applications, such as a browser, including computer code run using a central processing unit such as an Intel Pentium® processor or the like. Similarly, system 916 (and additional instances of an MTS, where more than one is present) and all of their components might be operator configurable using application(s) including computer code to run using a central processing unit such as processor system 917, which may include an Intel Pentium® processor or the like, and/or multiple processor units.

A computer program product implementation includes a machine-readable storage medium (media) having instructions stored thereon/in which can be used to program a computer to perform any of the processes of the embodiments described herein. Computer code for operating and configuring system 916 to intercommunicate and to process web pages, applications and other data and media content as described herein are preferably downloaded and stored on a hard disk, but the entire program code, or portions thereof, may also be stored in any other volatile or non-volatile memory medium or device, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, or transmitted over any other conventional network connection (e.g., extranet, VPN, LAN, etc.) using any communication medium and protocols (e.g., TCP/IP, HTTP, HTTPS, Ethernet, etc.). It will also be appreciated that computer code for implementing embodiments can be implemented in any programming language that can be executed on a client system and/or server or server system such as, for example, C, C++, HTML, any other markup language, Java™, JavaScript®, ActiveX®, any other scripting language, such as VBScript, and many other programming languages as are well known may be used. (Java™ is a trademark of Sun Microsystems®, Inc.).

According to some embodiments, each system 916 is configured to provide web pages, forms, applications, data and media content to user (client) systems 912 to support the access by user systems 912 as tenants of system 916. As such, system 916 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include logically and/or physically connected servers distributed locally or across one or more geographic locations. Additionally, the term "server" is meant to include a computing system, including processing hardware and process space(s), and an associated storage system and database application (e.g., OODBMS or RDBMS) as is well known in the art.

It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

FIG. 10 also shows a block diagram of environment 910 further illustrating system 916 and various interconnections, in accordance with some embodiments. FIG. 10 shows that user system 912 may include processor system 912A, memory system 912B, input system 912C, and output system 912D. FIG. 10 shows network 914 and system 916. FIG. 10 also shows that system 916 may include tenant data storage 922, tenant data 923, system data storage 924, system data 925, User Interface (UI) 1030, Application Program Interface (API) 1032, PL/SOQL 1034, save routines 1036, application setup mechanism 1038, applications servers 10001-1000N, system process space 1002, tenant process spaces 1004, tenant management process space 1010, tenant storage area 1012, user storage 1014, and application metadata 1016. In other embodiments, environment 910 may not have the same elements as those listed above and/or may have other elements instead of, or in addition to, those listed above.

User system 912, network 914, system 916, tenant data storage 922, and system data storage 924 were discussed above in FIG. 9. Regarding user system 912, processor system 912A may be any combination of processors. Memory system 912B may be any combination of one or more memory devices, short term, and/or long term memory. Input system 912C may be any combination of input devices, such as keyboards, mice, trackballs, scanners, cameras, and/or interfaces to networks. Output system 912D may be any combination of output devices, such as monitors, printers, and/or interfaces to networks. As shown by FIG. 10, system 916 may include a network interface 920 (of FIG. 9) implemented as a set of HTTP application servers 1000, an application platform 918, tenant data storage 922, and system data storage 924. Also shown is system process space 1002, including individual tenant process spaces 1004 and a tenant management process space 1010. Each application server 1000 may be configured to tenant data storage 922 and the tenant data 923 therein, and system data storage 924 and the system data 925 therein to serve requests of user systems 912. The tenant data 923 might be divided into individual tenant storage areas 1012, which can be either a physical arrangement and/or a logical arrangement of data. Within each tenant storage area 1012, user storage 1014 and application metadata 1016 might be similarly allocated for each user. For example, a copy of a user's most recently used (MRU) items might be stored to user storage 1014. Similarly, a copy of MRU items for an entire organization that is a tenant might be stored to tenant storage area 1012. A UI 1030 provides a user interface and an API 1032 provides an application programmer interface to system 916 resident processes to users and/or developers at user systems 912. The tenant data and the system data may be stored in various databases, such as Oracle™ databases.

Application platform 918 includes an application setup mechanism 1038 that supports application developers' creation and management of applications, which may be saved as metadata into tenant data storage 922 by save routines 1036 for execution by subscribers as tenant process spaces 1004 managed by tenant management process 1010 for example. Invocations to such applications may be coded using PL/SOQL 34 that provides a programming language style interface extension to API 1032. A detailed description of some PL/SOQL language embodiments is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007, which is hereby incorporated by reference in its entirety and for all purposes. Invocations to applications may be detected by system processes, which manage retrieving application metadata 1016 for the subscriber making the invocation and executing the metadata as an application in a virtual machine.

Each application server 1000 may be communicably coupled to database systems, e.g., having access to system data 925 and tenant data 923, via a different network connection. For example, one application server 10001 might be coupled via the network 914 (e.g., the Internet), another application server 1000N−1 might be coupled via a direct network link, and another application server 1000N might be coupled by yet a different network connection. Transfer Control Protocol and Internet Protocol (TCP/IP) are typical protocols for communicating between application servers 1000 and the database system. However, other transport protocols may be used to optimize the system depending on the network interconnect used.

In certain embodiments, each application server 1000 is configured to handle requests for any user associated with any organization that is a tenant. Because it is desirable to be able to add and remove application servers from the server pool at any time for any reason, there is preferably no server affinity for a user and/or organization to a specific application server 1000. In some embodiments, therefore, an interface system implementing a load balancing function (e.g., an F5 Big-IP load balancer) is communicably coupled between the application servers 1000 and the user systems 912 to distribute requests to the application servers 1000. In some embodiments, the load balancer uses a least connections algorithm to route user requests to the application servers 1000. Other examples of load balancing algorithms, such as round robin and observed response time, also can be used. For example, in certain embodiments, three consecutive requests from the same user could hit three different application servers 1000, and three requests from different users could hit the same application server 1000. In this manner, system 916 is multi-tenant, wherein system 916 handles storage of, and access to, different objects, data and applications across disparate users and organizations.

As an example of storage, one tenant might be a company that employs a sales force where each call center agent uses system 916 to manage their sales process. Thus, a user might maintain contact data, leads data, customer follow-up data, performance data, goals and progress data, etc., all applicable to that user's personal sales process (e.g., in tenant data storage 922). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a call center agent is visiting a customer and the customer has Internet access in their lobby, the call center agent can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 916 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 916 might also maintain system level data usable by multiple tenants or other data. Such system level data might include industry reports, news, postings, and the like that are sharable among tenants.

In certain embodiments, user systems 912 (which may be client machines/systems) communicate with application servers 1000 to request and update system-level and tenant-level data from system 916 that may require sending one or more queries to tenant data storage 922 and/or system data storage 924. System 916 (e.g., an application server 1000 in system 916) automatically generates one or more SQL statements (e.g., SQL queries) that are designed to access the desired information. System data storage 924 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to some embodiments. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for account, contact, lead, and opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. Pat. No. 7,779,039, titled CUSTOM ENTITIES AND FIELDS IN A MULTI-TENANT DATABASE SYSTEM, by Weissman, et al., and which is hereby incorporated by reference in its entirety and for all purposes, teaches systems and methods for creating custom objects as well as customizing standard objects in a multi-tenant database system. In some embodiments, for example, all custom entity data rows are stored in a single multi-tenant physical table, which may contain multiple logical tables per organization. In some embodiments, multiple "tables" for a single customer may actually be stored in one large table and/or in the same table as the data of other customers.

These and other aspects of the disclosure may be implemented by various types of hardware, software, firmware, etc. For example, some features of the disclosure may be implemented, at least in part, by machine-readable media that include program instructions, state information, etc., for performing various operations described herein. Examples of program instructions include both machine code, such as produced by a compiler, and files containing higher-level code that may be executed by the computer using an interpreter. Examples of machine-readable media include, but are not limited to, magnetic media such as hard disks, floppy disks, and magnetic tape; optical media such as CD-ROM disks; magneto-optical media; and hardware devices that are specially configured to store and perform program instructions, such as read-only memory devices ("ROM") and random access memory ("RAM").

While one or more embodiments and techniques are described with reference to an implementation in which a service cloud console is implemented in a system having an application server providing a front end for an on-demand database service capable of supporting multiple tenants, the one or more embodiments and techniques are not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

While various embodiments have been described herein, it should be understood that they have been presented by way of example only, and not limitation. Thus, the breadth and scope of the present application should not be limited by any of the embodiments described herein, but should be defined only in accordance with the following and later-submitted claims and their equivalents.

What is claimed is:

1. A computer-implemented method comprising:
receiving a request to display a line chart on a display screen of a mobile computing system, the line chart having a plurality of connected line segments;
determining an amount of space available to display the line chart on the display screen and a number of data points to be displayed in the line chart; and
displaying the line chart with the data points and a plurality of connected line segments connecting the data points on the display screen of the mobile computing system, each of the plurality of connected line segments having a thickness corresponding to the number of data points being displayed in the line chart, a range of values for at least one of a vertical scale and a horizontal scale associated with the line chart, and the amount of space available to display the line chart, wherein the thickness of the connected line segments of the line chart is relatively thinner when the line chart includes higher density of information corresponding to a larger number of data points to be displayed within the range of values in the line chart when the display screen has less screen space and relatively thicker when the line chart includes a lesser number of data points to be displayed within the range of values in the line chart when the display screen has more screen space.

2. The method of claim 1, further comprising updating the thickness of the connected line segments of the line chart based on detecting an update to the number of data points of the line chart.

3. The method of claim 2, wherein there are two or more thickness levels, and wherein the thickness of the connected line segments of the line chart is maintained at a first thickness level based on the updated number of data points being within a first threshold window.

4. The method of claim 3, wherein the thickness of the connected line segments of the line chart is updated from the first thickness level to a second thickness level based on the updated number of data points being within a second threshold window.

5. The method of claim 2, further comprising providing a mechanism to enable updating the number of data points to be displayed in the line chart based on a change of the range values.

6. The method of claim 2, wherein the update to the number of data points of the line chart comprises an update to a range of information to be represented by the line chart, wherein a wider range corresponds to a higher number of data points and a narrower range corresponds to a lower number of data points.

7. The method of claim 2, further comprising:
determining available screen space on the display screen of the mobile computing system to display the line chart, wherein determining the thickness of the connected line segments on the line chart further comprises determining the thickness of the connected line segments based on the available screen space.

8. An apparatus for displaying line charts, the apparatus comprising:
a processor; and
one or more stored sequences of instructions which, when executed by the processor, cause the processor to:
receive a request to display a line chart on a display screen of a mobile computing system, the line chart having a plurality of connected line segments;
determine an available screen space to display the line chart on the display screen of the mobile computing system and a number of data points to be displayed in the line chart; and
display the line chart with the data points and a plurality of connected line segments connecting the data points on the display screen of the mobile computing system, each of the plurality of connected line segments having a thickness corresponding to the number of data points being displayed in the line chart, a range of values for at least one of a vertical scale and a horizontal scale associated with the line chart, and the amount of space available to display the line chart, wherein the thickness of the connected line segments of the line chart is relatively thinner when the line chart includes higher density of information corresponding to a larger number of data points to be displayed within the range of values in the line chart when the display screen has less screen space and relatively thicker when the line chart includes a lesser number of data points to be displayed within the range of values in the line chart when the display screen has more screen space.

9. The apparatus of claim 8, further comprising instructions to cause the processor to update the thickness of the connected line segments of the line chart based on detecting an update to the number of data points.

10. The apparatus of claim 9, wherein there are two or more thickness levels, and wherein the thickness of the connected line segments of the line chart is maintained at a first thickness level based on the updated number of data points being within a first threshold window.

11. The apparatus of claim 10, wherein the thickness of the connected line segments of the line chart is updated from the first thickness level to a second thickness level based on the updated number of data points being within a second threshold window.

12. The apparatus of claim 9, further comprising instructions to cause the processor to provide a mechanism to enable updating the number of data points to be displayed in the line chart based on a change of the range values.

13. The apparatus of claim 12, wherein the instructions to cause the processor to update the number of data points comprises instructions to cause the processor to update a range of information to be represented by the line chart, wherein a wider range corresponds to a higher number of data points and a narrower range corresponds to a lower number of data points.

14. A non-transitory machine-readable medium carrying one or more sequences of instructions for display line charts, which instructions, when executed by one or more processors, cause the one or more processors to:
receive a request to display a line chart on a screen of a mobile computing system, the line chart having a plurality of connected line segments;
determine an amount of space available to display the line chart on the display screen and a number of data points to be displayed in the line chart; and
display, on the display screen of the mobile computing system, the line chart with the data points and a plurality of connected line segments connecting the data points, each of the plurality of connected line segments having a thickness corresponding to the number of data points being displayed in the line chart, a range of values for at least one of a vertical scale and a horizontal scale associated with the line chart, and the amount of space available to display the line chart, wherein the thickness of the connected line segments of the line chart is relatively thinner when the line chart includes higher density of information corresponding to a larger number of data points to be displayed within the range of values in the line chart when the display screen has less screen space and relatively thicker when the line chart includes a lesser number of data points to be displayed within the range of values in the line chart when the display screen has more screen space.

15. The non-transitory machine-readable medium of claim 14, further comprising instructions to cause the processor to update the thickness of the line segments of the line chart based on detecting an update to the number of data points.

16. The non-transitory machine-readable medium apparatus of claim 15, wherein there are two or more thickness levels, and wherein the thickness of the line segments of the line chart is maintained at a first thickness level based on the updated number of data points being within a first threshold window.

17. The non-transitory machine-readable medium of claim 16, wherein the thickness of the line segments of the line chart is updated from the first thickness level to a second thickness level based on the updated number of data points being within a second threshold window.

* * * * *